(12) United States Patent
Alfieri (10) Patent No.: US 9,189,199 B2
(45) Date of Patent: Nov. 17, 2015

(54) FOLDED FIFO MEMORY GENERATOR

(71) Applicant: NVIDIA CORPORATION, Santa Clara, CA (US)

(72) Inventor: Robert A. Alfieri, Chapel Hill, NC (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 13/707,408

(22) Filed: Dec. 6, 2012

(65) Prior Publication Data

US 2014/0164655 A1     Jun. 12, 2014

(51) Int. Cl.
*G06F 5/14* (2006.01)

(52) U.S. Cl.
CPC ........................ *G06F 5/14* (2013.01)

(58) Field of Classification Search
CPC ............... G06F 5/12; G06F 5/14; G06F 5/06; G06F 2205/126; G06F 13/28
USPC .......................................................... 710/53
See application file for complete search history.

(56) References Cited

U.S. PATENT DOCUMENTS

| | | | |
|---|---|---|---|
| 5,804,986 A * | 9/1998 | Jones | 326/40 |
| 5,995,415 A * | 11/1999 | Kuo et al. | 365/185.11 |
| 6,081,147 A * | 6/2000 | Okajima | 327/284 |
| 7,092,115 B1 * | 8/2006 | Nakata | 358/1.16 |
| 7,595,443 B2 * | 9/2009 | Yagi | 84/600 |
| 8,611,173 B1 * | 12/2013 | Zhang | 365/230.02 |
| 2008/0008019 A1 * | 1/2008 | Balasuramanian | 365/208 |
| 2008/0177940 A1 | 7/2008 | Risse | |
| 2011/0296118 A1 * | 12/2011 | Carter et al. | 711/154 |

FOREIGN PATENT DOCUMENTS

| | | |
|---|---|---|
| CN | 1319202 A | 10/2001 |
| CN | 101566941 A | 10/2009 |
| TW | 426823 B | 3/2001 |
| TW | 200424849 A | 11/2004 |
| TW | 201027530 A | 7/2010 |

* cited by examiner

*Primary Examiner* — Farley Abad
(74) *Attorney, Agent, or Firm* — Artegis Law Group, LLP (57) ABSTRACT

Synthesizable code representing first-in-first out (FIFO) memories may be used to produce FIFO memories in a hardware element or system. To more efficiently use a memory element that stores the data in a FIFO, a code generator may generate a wrapper that enables the FIFO to use a memory element with different dimension (i.e., depth and width) than the FIFO's dimensions. For example, the wrapper enables a 128 deep, 1 bit wide FIFO to store data in a memory element with 16 rows that store 8 bits each. To any system communicating with the FIFO, the FIFO behaves like a 128×1 FIFO even though the FIFO is implemented using a 16×8 memory element. To do so, the code generator may generate a wrapper which enables the folded memory element to behave like a memory element that was not folded.

22 Claims, 7 Drawing Sheets

FOLDED FIFO MEMORY GENERATOR

BACKGROUND OF THE INVENTION

1. Field of the Invention

Embodiments of the present invention generally relate to designing first-in first-out (FIFO) memories, and more specifically, to folding the depth and width of the FIFO memory to identify the dimensions of a corresponding memory element.

2. Description of the Related Art

Integrated circuits designed to process data typically use FIFO memories to store data between processing stages. These FIFO memories may have different widths, depths, and different input and output clock frequencies. Conventionally, generators that produce synthesizable code have been used to produce different variations of FIFO memories. However, different physical characteristics of the FIFO memory may lead to inefficiencies. For example, in response to a request, the generator may produce synthesizable code corresponding to a 128×1 FIFO (i.e., a FIFO that has 128 entries that are 1 bit each). However, if this FIFO is implemented using RAM, the width of a RAM cell may be at least 8 bits wide. Accordingly, a 128 deep FIFO would require 128 rows of RAM that are each 8 bits wide. Because each entry stores only one bit, the other seven bits of the row are unused. This inefficiency may lead to the hardware system consuming additional power and requiring more space than is otherwise necessary.

SUMMARY OF THE INVENTION

Embodiments of the present invention describe a method and a computer-readable storage medium that receive a request to store a first data portion in a FIFO memory. The method and storage medium store the first data portion in a buffer in the FIFO memory. The method and storage medium receive a request to store a second data portion in the FIFO memory and determine that storing the second data portion in the buffer would exceed a capacity of the buffer. The method and storage medium store the contents of the buffer into a single row of a memory element in the FIFO memory where each row in the memory element is sized to store multiple data portions Another embodiment of the present invention describes a FIFO memory that includes a buffer for storing a plurality of data portions associated with write requests received by the FIFO memory. The FIFO memory also includes a memory element coupled to the buffer, where each row in the memory element is sized to store multiple data portions. The FIFO memory includes routing logic configured to, determine that storing a next data portion in the buffer would exceed a capacity of the buffer and store the contents of the buffer into a single row of the memory element.

By folding the depth and width of the FIFO memory to identify the dimensions of a corresponding memory element, the present embodiments may improve the energy efficiency and the area needed by a hardware system. Specifically, the resulting memory element may reduce the number of unused memory cells relative to a memory element for a FIFO whose dimensions were not folded.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

To more efficiently use a memory element that stores the data in a FIFO, a code generator may generate a wrapper that enables the FIFO to use a memory element with different dimension (i.e., depth and width) than the FIFO's dimensions. For example, the wrapper enables a 128 deep, 1 bit wide FIFO to store data in a memory element with 16 rows that store 8 bits each. To any system communicating with the FIFO, the FIFO behaves like a 128×1 FIFO even though the FIFO is implemented using a 16×8 memory element. In one embodiment, the dimensions of the FIFO are folded to determine the dimensions of the corresponding memory element. For example, assume the code generator is asked to configure a FIFO that has 128 entries that are each 1 bit wide (128×1). However, if the individual rows of the memory element are restricted to a minimum of 8 bits, without folding the dimensions of the memory element the actual memory element used for this FIFO may be 128×8 (i.e., 128 rows with 9 memory cells per row). In such an embodiment, seven bits on each row may be unused. Instead, the generator may fold the dimensions of the requested FIFO, thereby reducing the depth of the memory element and increasing its width by a corresponding amount to maintain the total storage size of the memory element. For example, a 128×1 FIFO folded by a factor of 2 may be implemented by a 64×2 memory element.

The code generator may generate a wrapper which enables the folded memory element to behave like a memory element that was not folded. In particular, the wrapper includes logic that governs how data is read into, and read out of, the folded memory element. Using the 128×1 FIFO as an example, the wrapper may store data in 8 bit chunks in the folded 16×8 memory element. In this manner, each storage location in the memory element may be used. Not only does folding the dimensions of the memory element improve storage efficiency, the resulting memory element may require less area (e.g., have smaller footprint in an integrated circuit) relative to using an unfolded memory element. Continuing the example above, a folded 16×8 memory element only needs area sufficient to store 128 bits while a 128×8 memory element requires area necessary to store 1024 bits.

Figure 1:
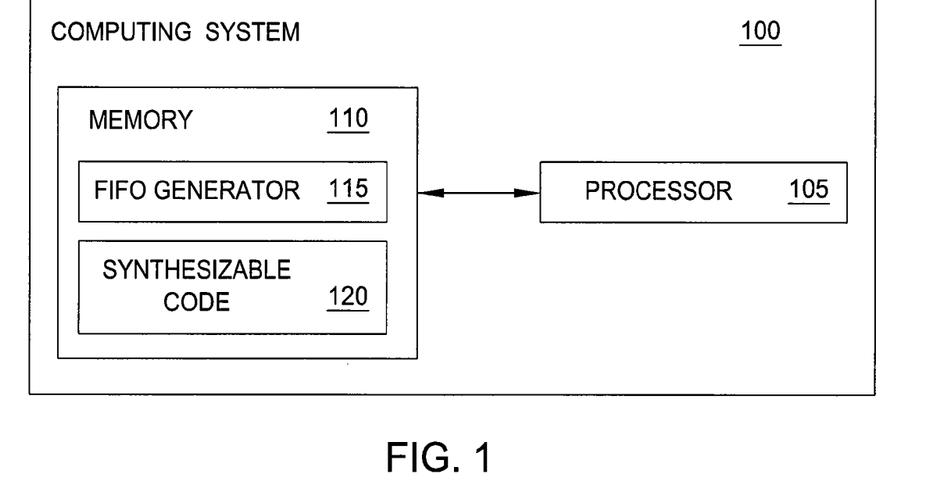
FIG. 1 illustrates a block diagram of a computing device including a FIFO code generator, according to one embodiment of the present invention.

FIG. 1 illustrates a block diagram of a computing system 100 including a FIFO code generator 115, according to one embodiment of the present invention. Specifically, the system 100 includes a processor 105 and a system memory 110. A FIFO generator 115 may be a program or application stored in memory 110. When executed by processor 105, generator 115 produces synthesizable code 120 representing a FIFO memory. Synthesizable code 120 may be combined with other code, produced by a generator program or authored by a programmer, to produce synthesizable code for an integrated circuit. Synthesizable code 120 may be written in Verilog, VHDL, or other hardware description languages known to those skilled in the art. Synthesizable code 120 may be synthesized using a commercially available synthesis tools such as Design Compiler® produced by Synopsys and Synplify® produced by Synplicity, to produce a netlist defining the components and connections of the integrated circuit. In one embodiment, the netlist may be used to design and manufacture FIFO memories in a graphics processing unit (GPU) that may be used in a computing device such as a desktop computer, laptop computer, mobile phone, server, and the like.

Figure 2:
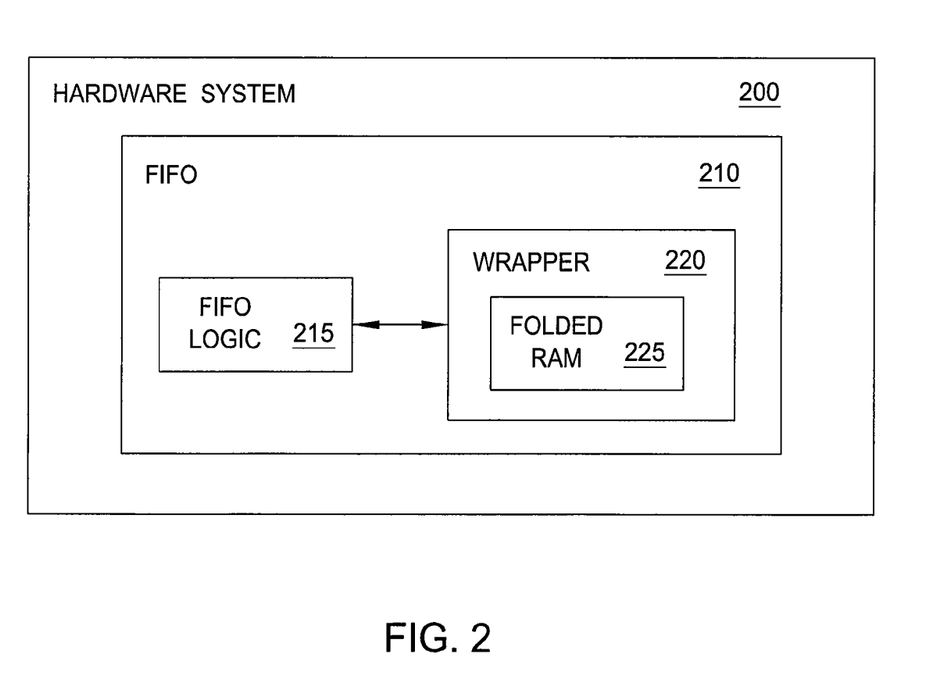
FIG. 2 illustrates a block diagram of a hardware system including a FIFO with a folded memory unit, according to one embodiment of the present invention.

FIG. 2 illustrates a block diagram of a hardware system 200 including a FIFO with a folded memory unit, according to one embodiment of the present invention. The hardware system 200 may be an integrated circuit, (e.g., a GPU or CPU), a FPGA, a memory, hardware units mounted on a shared PCB, and the like. The hardware system includes a FIFO 210 that was generated, at least in part, using the synthesizable code from FIG. 1. That is, the FIFO 210 includes one or more hardware elements whose functions are defined by the synthesizable code produced by the FIFO code generator. The FIFO 210 includes FIFO logic 215 that includes the necessary logic for performing FIFO operations (e.g., store and retrieve). The FIFO logic 215 may also be tasked with receiving the data store requests from other components in the hardware system 200 as well as transmitting requested data to these components. The FIFO 210 includes wrapper 220 which enables the FIFO logic 215 to interact with the folded random access memory (RAM) 225. For example, the FIFO logic 215 may input the data and the corresponding write address to wrapper 220 which then controls how that data is written into folded RAM 225. Using wrapper 220, the FIFO logic 215 may be configured to perform as if the FIFO logic 215 was coupled to an unfolded memory element instead of a folded memory element. In one embodiment, the FIFO logic 215 may be the same logic that would be used even if the FIFO 210 included an unfolded memory element. Accordingly, in order to use a folded memory in the FIFO 210, only wrapper 220 needs to be added to the FIFO 210 while the rest of the FIFO logic 215 may remain essentially unchanged.

Folded RAM 225 is a memory element that has depth and width dimensions that differ from the dimensions that describe the FIFO 210. In one embodiment, even though the dimensions may differ, the total storage space may not, (although this is not a requirement). As an example where the total storage capacities may differ, a user may desire a FIFO that is 128 entries that each store 3 bits (i.e., a maximum capacity of 384 bits). Because of physical or design limitations associated with RAM, the dimensions of folded RAM 225 may be 64×8 (maximum capacity of 512 bits) rather than, for example, 32×6 which would match the capacity of a 128×3 FIFO. Thus, folded RAM 225 may include storage locations that are unused during the operation of the FIFO 210. Nonetheless, even if some locations are unused, folded RAM 225 may still be more energy efficient and/or area efficient than using an unfolded memory element (e.g., a 128×8 RAM). Although RAM is illustrated as the memory element of FIFO 210 in the embodiments of the present invention, this disclosure is not limited to such. In other embodiments, the memory element may be implemented by flip flops, registers, latches, and the like.

FIGS. 3A-3G illustrate writing to, and reading from, a FIFO memory using a wrapper 220 and a folded RAM 225, according to embodiments of the present invention. Specifically, wrapper 220 includes a buffer 302 (buff) and folded RAM 225. Buffer 302 is a memory element separate from folded RAM 225 and may be composed of a plurality of flip flops, latches, registers, and the like. The input of buffer 302 is coupled to the input (di) of wrapper 220 and, in this example, is 8 bits wide. For FIGS. 3A-3G, assume the FIFO is a 128 deep by 1 bit wide memory that is implemented using a 16×8 folded RAM 225.

Figure 3A:
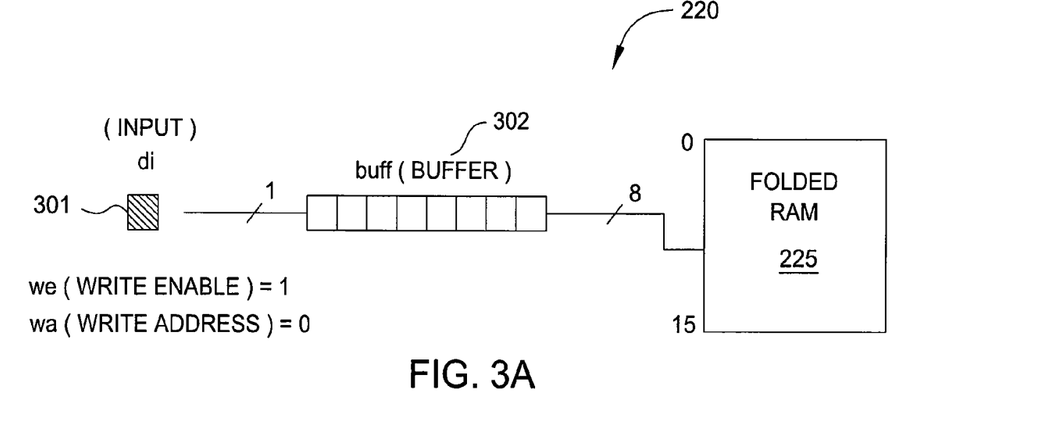
FIGS. 3A-3G illustrate writing to, and reading from, a FIFO memory, according to embodiments of the present invention.
Figure 3B:
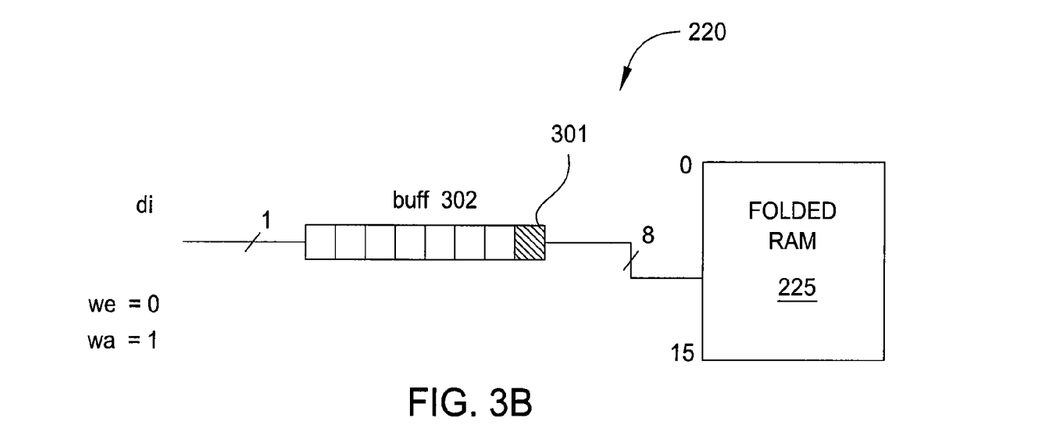

As shown in FIG. 3A, according to a clock signal (e.g., a leading or trailing edge), wrapper 220 receives a bit 301 to be stored in the FIFO as indicated by the write enable (we) signal. The FIFO logic (not shown) may forward the bit 301 to wrapper 220 as well as control the write enable signal. As shown in FIG. 3B, wrapper 220 stores the received bit in buffer 302 according to write address (wa). At this point, however, the bit 301 is not stored in folded RAM 225 (i.e., the primary storage element of the FIFO). Instead, the bit 301 remains stored in buffer 302. In one embodiment, the write process may be described as a two-step process where a bit 301 is received and then stored in buffer 302. The write process may take place during two sequential clock cycles or during a rising edge and a falling edge of the same cycle.

Figure 3C:
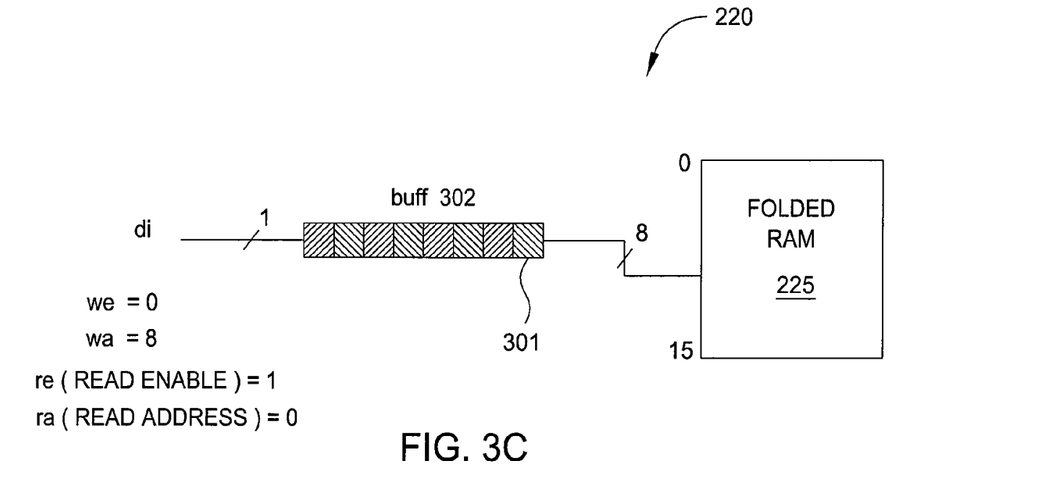

As shown in FIG. 3C, the write process is repeated until buffer 302 is full. For example, the FIFO may receive eight store commands where the FIFO logic transmits to wrapper 220 a bit corresponding to each command. Wrapper 220 stores these bits in buffer 302. As wrapper 220 stores the eighth received bit in buffer 302, a read enable (re) signal indicating that the FIFO should output the data bit that was stored first in the FIFO.

Figure 3D:
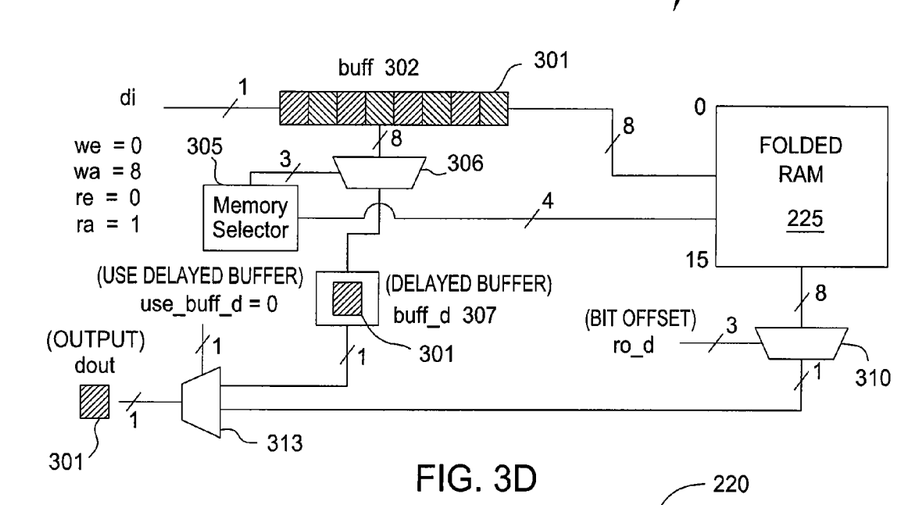

FIG. 3D illustrates logic that enables wrapper 220 to read data from either buffer 302 or folded RAM 225 to satisfy a read request. Specifically, wrapper 220 includes a memory selector 305 that is configured to determine whether the data requested is stored in either buffer 302 or folded RAM 225. If the data is in buffer 302, the memory selector 305 uses a three-bit signal, which may be based on the read address (ra), to select the corresponding bit from buffer 302. For example, each memory location in buffer 302 may be coupled to an eight input/one output multiplexer 306 or mux where the three-bit signal is used to select one of the storage locations. If the data is stored in folded RAM 225, the memory selector 305 may transmit a four-bit row address signal to folded RAM 225 which selects the row on which the data is located. Reading from the RAM 225 will be discussed in more detail below.

Because the data correspond to the read address provided in FIG. 3D (i.e., bit 301) is stored in buffer 302, the memory selector 305 transmits a copy of this data to a delayed buffer 307 (buff_d). That is, in one embodiment, bit 301 is stored in the delayed buffer 307 without being evicted from buffer 302. Even though bit 302 remains stored in the memory elements in wrapper 220, the FIFO logic outside of the wrapper may invalidate the memory address corresponding to bit 301— i.e., Address 1. Thus, during a retrieve operation, the data being read out may be logically evicted from the FIFO while the actual data may remain stored in the FIFO. Continuing this example, Address 2 becomes the top of the FIFO memory. Thus, if the FIFO was asked to perform another retrieve operation, the new read address provided by the FIFO logic would be Address 2. Accordingly, in this embodiment, managing the data may be performed by the FIFO logic that is external to wrapper 220. In other embodiments, however, wrapper 220 itself may have the circuitry necessary to both manage and store the data.

Because the requested data may come from either buffer 302 or folded RAM 225, wrapper 220 includes the mux 313 which is controlled by the delayed buffer control signal (use_buff_d). As shown here, if this signal is low, the output (dout) of wrapper 220 is the output of the delayed buffer 307. If the signal is high, the output bit is provided by folded RAM 225.

Figure 3E:
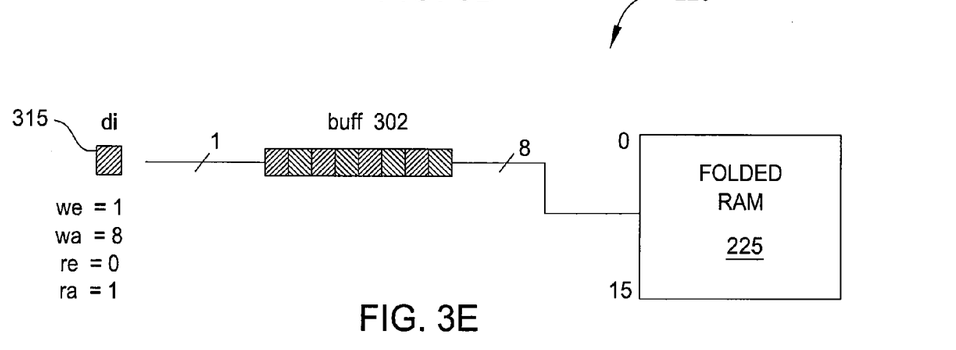

At FIG. 3E, wrapper 220 receives a ninth bit 315 at the input as indicated by the write enable signal. Before storing the received data, however, wrapper 220 may transfer at least a portion of the data stored in buffer 302 to folded RAM 225. In one embodiment, wrapper 220 may use a combination of the write enable signal and the current write address to determine if at least some of the contents in buffer 302 should be transferred. For example, if the write enable signal is high and the write address has a value corresponding to a multiple of the storage capacity of buffer 302, wrapper 220 transfers the data in buffer 302 into folded RAM 225.

Figure 3F:
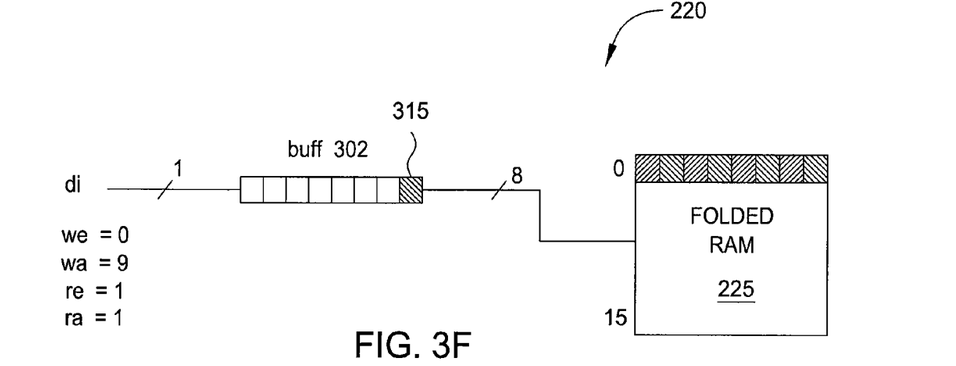
Figure 3G:
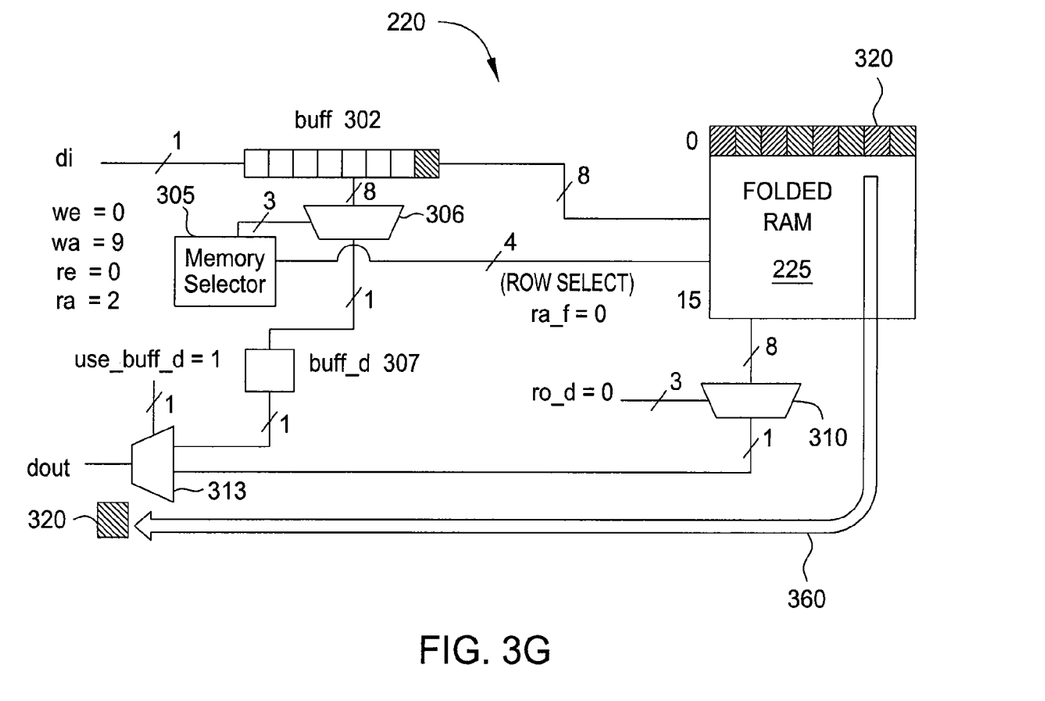

As shown in FIG. 3F, the contents of buffer 302 are stored into folded RAM 225 (e.g., the first row). In addition, the input bit 315 is stored in the now empty buffer 302. Although shown as happening simultaneously, in another embodiment, the process illustrates in FIG. 3F may occur on, for example, different clock cycles. As more data is stored in the FIFO, wrapper 220 may continue to fill up buffer 302. Once this memory element again fills up, wrapper 220 may transfer the data to folded RAM 225. In one embodiment, wrapper 220 may transfer the data upon determining buffer 302 is full without waiting until new data is received.

In one embodiment, the FIFO logic outside of wrapper 220 may determine what to do if the capacity of the FIFO is exceeded, which, in this example, occurs when the FIFO is asked to store more than 128 bits of data. If asked to store more than the FIFO's capacity, in one embodiment, the FIFO logic may backpressure the sender if the sender is stallable. Moreover, the FIFO logic may continually determine the address that corresponds to the top of the FIFO. Assume for example that the FIFO stores 128 bits of data and reads out the first 8 bits. Because the data in a FIFO is accessed sequential, the first 8 bits of data stored at Addresses 1-8 are invalidated by the FIFO logic. If the FIFO logic then forwards 8 additional bits to store, wrapper 220 is free to store these bits into the storage locations previously occupied by the bits that were read out—i.e., Address 1-8. The top of the FIFO queue would be Address 9 while Address 8 is the bottom of the FIFO. In this manner, the FIFO can be updated without having to evict and shift data in buffer 302 and folded RAM 225 in response to requests to retrieve data.

Returning to FIG. 3E, while wrapper 220 stored bit 315 into buffer 302, the read enable signal may indicate that the FIFO logic is requesting wrapper 220 to perform another read operation. In contrast to FIG. 3D where the requested data is stored in buffer 302, in FIG. 3G, wrapper 220 retrieves the requested data 302 from folded RAM 225. In one embodiment, memory selector 305 determines whether the requested data 320 is stored in buffer 302 or folded RAM 225. For example, based on the read address, memory selector 305 may determine whether the requested data 320 has previously been moved from buffer 302 to folded RAM 225. Because the requested data bit 320 was moved into the RAM 225 in FIG. 3F, the memory selector 305 uses the row select signal (ra_f) to activate the row in folded RAM 225 that corresponds to the requested bit 320. The data in the row may then be outputted by folded RAM 225.

Wrapper 220 includes a bit offset signal (ro_d) that selects a particular bit of folded RAM's eight bit output. Specifically, the bit offset signal is used as a control signal for mux 310 to select the correct bit from the row. The select signal for mux 313 is then controlled such that the output from mux 310 is used as the output of wrapper 220 while the output of the delayed buffer 307 is ignored. The general path taken by bit 320 as it is outputted from wrapper 220 (i.e., through mux 310 and 313) is shown graphically by arrow 360. Retrieving the requested data 320 from folded RAM 225 and outputting that data from wrapper 220 may, in one embodiment, take only one cycle, while in other embodiments, the read process may require multiple cycles. Although FIGS. 3A-3G illustrate FIFO entries that are only one bit wide, a wrapper may be configured to store and retrieve FIFO entries with any number of bits, e.g., a FIFO that has 64 entries that are 2 bits wide.

Figure 4A:
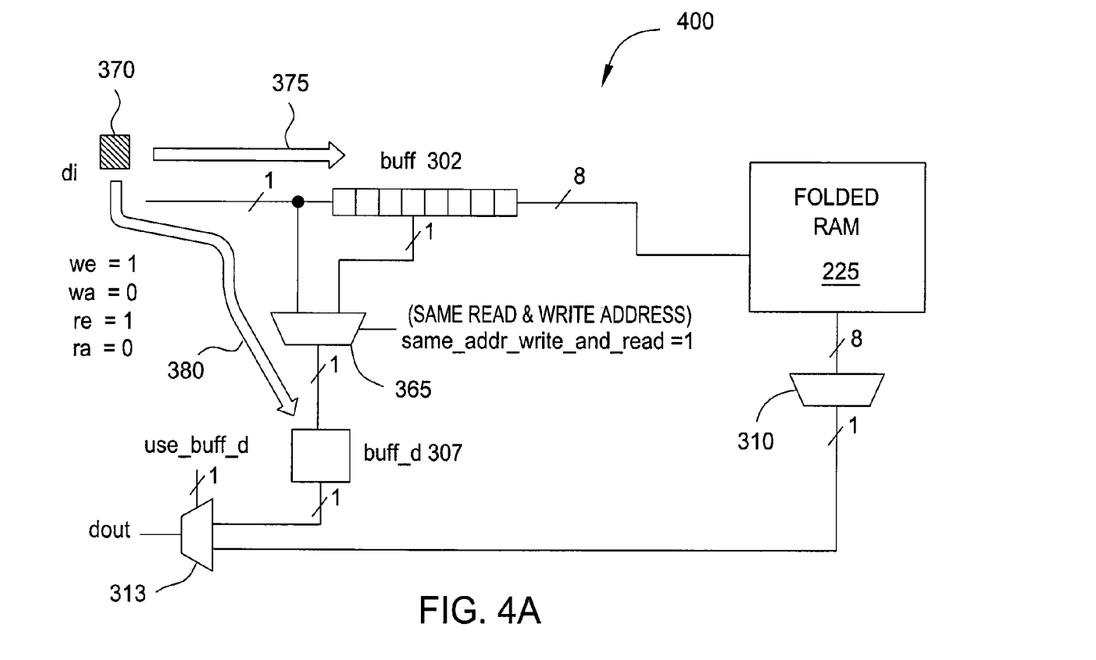
FIGS. 4A-4B illustrate writing data to, and reading data from, the same memory address in a FIFO memory, according to embodiments of the present invention.
Figure 4B:
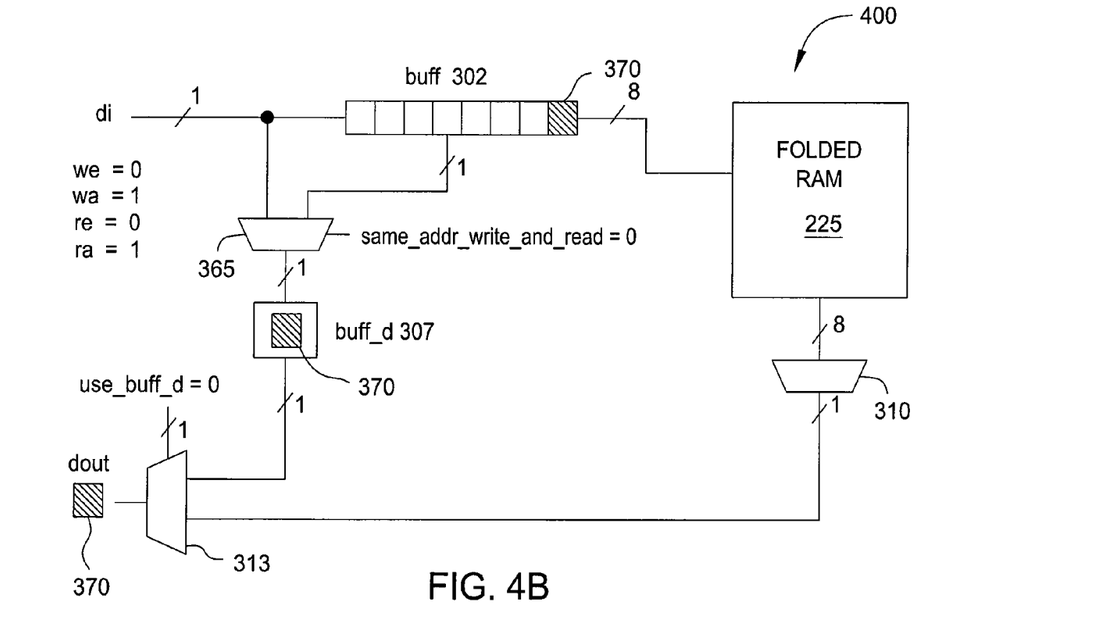

FIGS. 4A-4B illustrate writing data to, and reading data from, the same memory address in a FIFO memory, according to embodiments of the present invention. Specifically, FIG. 4A illustrates a wrapper 400 in a FIFO memory that enables writing to and reading from the same FIFO memory address in parallel. That is, in addition to being able to read and write to different addresses simultaneously, the FIFO memory shown in FIG. 4A-4B can perform a read and write to the same address simultaneously. To perform a read and write to the same address, both the write and read enable signals go high. Moreover, wrapper 400 includes a data path that enables the received data 370 to bypass buffer 302. As shown, mux 365 controls whether the received data bit is permitted to bypass buffer 302 to be stored directly into the delayed buffer 307. Mux 365 is controlled by a control signal (same_addr_write_and_read) which is based on the write enable and read enable signals to the same address. If the both of these signals are high, the control signal for the mux 365 routes the data received at the wrapper's input to the delayed buffer 307 as shown by arrow 380. If not, mux 365 transfers a data bit stored into buffer 302 into the delayed buffer 307. Regardless whether mux 365 permits the received data 370 to bypass buffer 302, arrow 375 illustrates that the received bit 370 is transmitted to buffer 302 for storage. Although not shown, the wrapper may include the same memory selector discussed in FIG. 3G for retrieving requested data from buffer 302.

FIG. 4B illustrates the state of wrapper 400 when the received data is outputted. Wrapper 400 controls the mux 313 such that the output of the delayed buffer 307—i.e., the received bit 370—becomes the output of wrapper 400. In this manner, data received in one cycle can be output in the next cycle. If wrapper 400 did not include the mux 365, the data 370 would be retrieved from buffer 302 which may require additional clock cycles. Thus, in embodiments where writing to and reading from the same address simultaneously is desired, wrapper 400 may be preferred. Although not shown, wrapper 400 may include additional logic for accessing and retrieving data stored in folded RAM 225 as discussed above in FIGS. 3A-3G.

Table 1 illustrate synthesizable code for generating a folded FIFO, Specifically, Table 1 illustrates synthesizable code 500 that may be produced by the FIFO generator illustrated in FIG. 1. When synthesized, the code in Table 1 configures hardware logic (e.g., the logic shown in FIGS. 3A-3G and FIGS. 4A-4B) to create the wrapper for a folded FIFO. That is, the synthesized code generates a folded FIFO with the functions discussed above. For the sake of clarity, the signals and circuitry shown in FIGS. 3A-3G and 4A-4B include the same variable names as the code provided in Tables 1 and 2.

TABLE 1

```
// folded ram wrapper
//
module fifo400__folded__ram__rwst__128x1(
    clk
    , clk_mgated
    , reset_
    , wa
    , we
    , di
    , ra
    , re
    , dout
    );
input       clk;
input       clk_mgated;
input       reset_;
input [6:0] wa;
input       we;
input [0:0] di;
input [6:0] ra;
input       re;
output [0:0] dout;
//Folded Ram
reg [7:0] buff;
reg [6:0] buff_wa;
wire [3:0] buff_wa_f = buff_wa[6:3];
wire [3:0] ra_f = ra[6:3];
wire       same_addr_write_and_read = we && re && wa == ra;
wire       use_buff_d_next = (ra_f == buff_wa_f &&
                  buff_wa[2:0] >= ra[2:0]) ||
same_addr_write_and_read;
reg        use_buff_d;
wire       we_f = we && wa[2:0] == 3'd0;
reg        did_re_f;
wire       re_f = re && !use_buff_d_next && (ra[2:0] == 3'd0 ||
                  !did_re_f);
reg [0:0]  buff_d;
wire [7:0] dout_f;
reg [2:0]  ro_d;
always @( posedge clk_mgated or negedge reset_ ) begin
    if ( !reset_ ) begin
        buff_wa <= #0.01 7'd0;
        did_re_f <= #0.01 1'd0;
    end else begin
        if ( we ) begin
buff_wa <= #0.01 wa; // note: resettable to avoid ramgen assert during first superfluous //write
        end
        did_re_f <= #0.01 re_f || (!use_buff_d_next && did_re_f
                 && ra[2:0] != 3'd0);
    end
end
always @( posedge clk_mgated ) begin
    if ( we ) begin
        case( wa[2:0] )
            3'd0: buff[0:0] <= di;
            3'd1: buff[1:1] <= di;
            3'd2: buff[2:2] <= di;
            3'd3: buff[3:3] <= di;
            3'd4: buff[4:4] <= di;
            3'd5: buff[5:5] <= di;
            3'd6: buff[6:6] <= di;
            3'd7: buff[7:7] <= di;
            // VCS coverage off
            default: buff <= #0.01 {8{1'bx}};
            // VCS coverage on
        endcase
    end
    if ( re ) begin
        if ( same_addr_write_and_read ) begin
            use_buff_d <= #0.01 1'b1;
            buff_d    <= #0.01 di;
```

TABLE 1-continued

```
        end else if ( use_buff_d_next ) begin
            use_buff_d <= #0.01 1'b1;
            case( ra[2:0] )
                3'd0: buff_d <= #0.01 buff[0:0];
                3'd1: buff_d <= #0.01 buff[1:1];
                3'd2: buff_d <= #0.01 buff[2:2];
                3'd3: buff_d <= #0.01 buff[3:3];
                3'd4: buff_d <= #0.01 buff[4:4];
                3'd5: buff_d <= #0.01 buff[5:5];
                3'd6: buff_d <= #0.01 buff[6:6];
                3'd7: buff_d <= #0.01 buff[7:7];
                // VCS coverage off
                default: buff_d <= #0.01 {1{1'bx}};
                // VCS coverage on
            endcase
        end else begin
            use_buff_d <= #0.01 1'b0;
            ro_d       <= #0.01 ra[2:0];
        end
    end
end
```

Table 2 illustrates synthesizable code configured to implement a folded memory element such as folded RAM 225 shown in FIGS. 3A-3G. In one embodiment, the synthesizable code in Table 2 is produced by the FIFO generator illustrated in FIG. 1. Alternatively, the FIFO generator may transmit the folded dimensions of the FIFO to a separate application or module which is configured to generate synthesizable code for memory elements (e.g., RAM).

TABLE 2

```
nv_ram_rwst_16x8 ram (
    .clk     ( clk )
    , .wa    ( buff_wa_f )
    , .we    ( we_f )
    , .di    ( buff )
    , .ra    ( ra_f )
    , .re    ( re_f )
    , .dout  ( dout_f )
);
reg [0:0] dout_fm;
always @( ro_d or dout_f ) begin
    case( ro_d )
        3'd0: dout_fm = dout_f[0:0];
        3'd1: dout_fm = dout_f[1:1];
        3'd2: dout_fm = dout_f[2:2];
        3'd3: dout_fm = dout_f[3:3];
        3'd4: dout_fm = dout_f[4:4];
        3'd5: dout_fm = dout_f[5:5];
        3'd6: dout_fm = dout_f[6:6];
        3'd7: dout_fm = dout_f[7:7];
        // VCS coverage off
        default: dout_fm = {1{1'bx}};
        // VCS coverage on
    endcase
end
assign dout = use_buff_d ? buff_d : dout_fm;
endmodule
```

Figure 5:
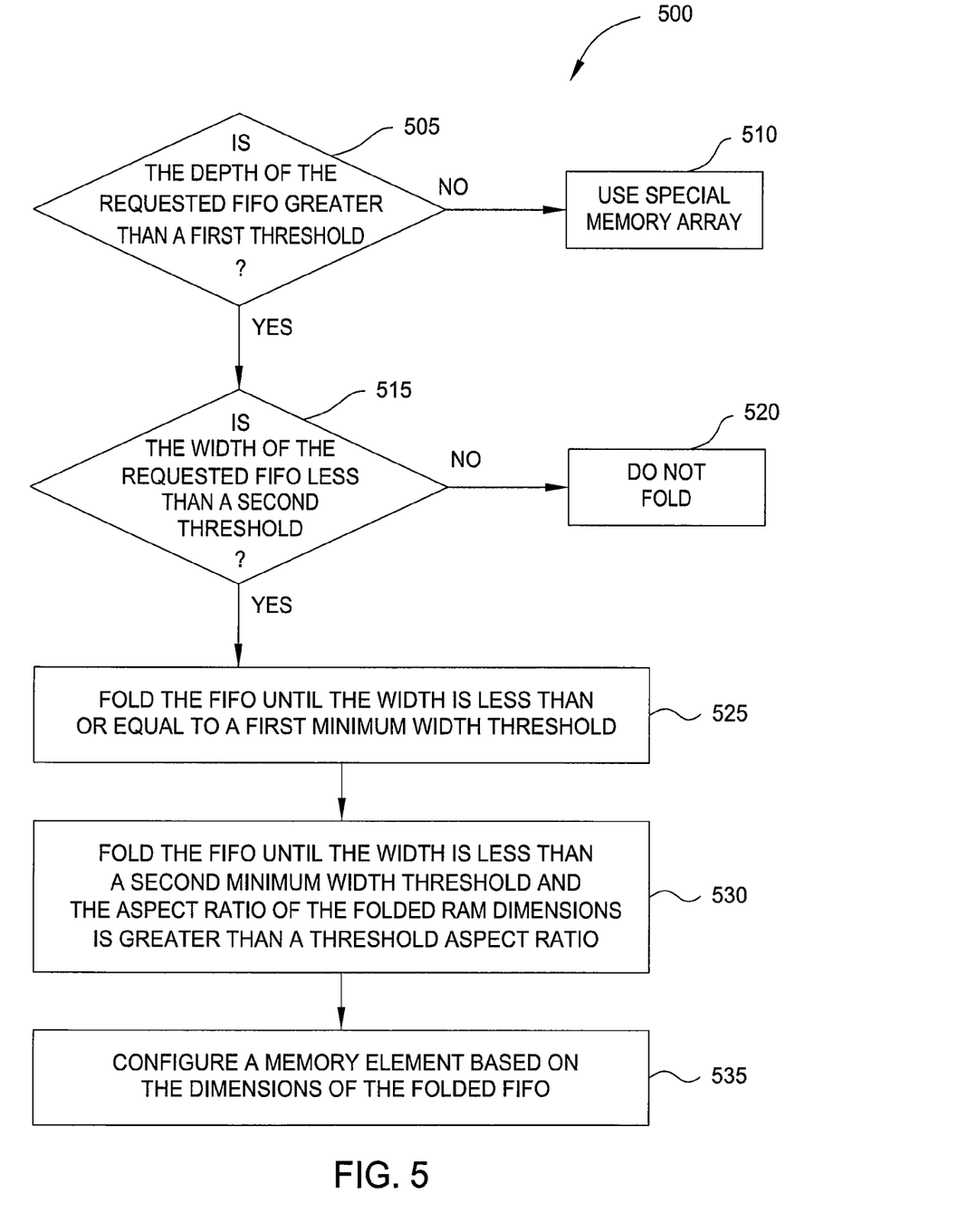
FIG. 5 is a method for determining when to fold the memory element of a FIFO, according to one embodiment of the present invention.

FIG. 5 is a method 500 for determining when to fold the memory element of a FIFO, according to one embodiment of the present invention. Specifically, the FIFO generator may use the method 500 to determine the dimensions of the memory element used to implement the FIFO in hardware. At block 505, the FIFO generator receives the desired depth and width of the FIFO. In one embodiment, these dimensions are provided by a user. The FIFO generator compares the provided depth to a first predefined threshold. If the depth is below the first threshold, at block 510, the FIFO generator may use a special memory array to store the data in the FIFO. Stated differently, if the FIFO is small (e.g., less than 32 entries), the FIFO generator may implement the FIFO using, for example, a latch array that is customized to fit the dimensions of the FIFO. However, if the depth exceeds the first threshold, the FIFO generator may use a memory element with dimensions that do not match the dimensions of the FIFO. As discussed above, in one embodiment, the FIFO may use a RAM memory where the number of memory cells in a row of the memory has a predetermined minimum value. In one embodiment, the FIFO generator may call a separate software application (e.g., a RAM generator) for generating synthesizable code for configuring the memory element.

If the desired depth of the FIFO exceeds the threshold, at block 515, the FIFO generator determines if the desired width of the FIFO is less than a second threshold. In one embodiment, the second threshold may be set based on the minimum storage capacity of a row in the memory element. For example, if a row in a RAM is at least 8 cells, a FIFO generator may fold a FIFO only if the desired width is less than 5 bits wide. If not, it may be more efficient to not fold the dimensions of the FIFO as shown by block 520, even if doing so results in unused memory cells. In another embodiment, the second threshold may be set to match the minimum width of a row in the memory element. Of course, the provided values for the first and second thresholds are for illustration purposes only and may be configured as needed.

At block 520, the FIFO generator folds the dimensions of the FIFO until the width is less than or equal to a first minimum width threshold. The FIFO generator may fold the generator in any number of ways. In one embodiment, the FIFO generator is configured to fold the FIFO such that the number of entries is divided by two while the width of each row is doubled. After folding, if the width is still below the first minimum width threshold, the FIFO generator may fold the FIFO by again halving the number of rows and doubling the row width. For example, if the first minimum width threshold is 10 and the desired FIFO dimensions are 64×3, the FIFO generator may fold these dimensions twice to yield 16×12. However, any folding factor may be used, for example, the FIFO generator may divide the depth by four while the width is multiplied by four.

At block 525, the FIFO generator may fold the FIFO until the width is less than a second minimum width threshold and the aspect ratio of the folded FIFO is greater than a threshold aspect ratio. As used herein, the aspect ratio is the ratio between the number of rows in a FIFO and the width of each row—i.e., the number of rows divided by width. Illustratively, a FIFO with dimensions of 128×1 has an aspect ratio of 128 while folding the FIFO by a factor of two yields dimensions of 64×2 and an aspect ratio of 32. Folding the FIFO dimensions based on the aspect ratio enables the FIFO generator to control the shape of the memory element used to implement the FIFO—i.e., the relationship between the rows and columns. For example, it may be desirable to ensure the aspect ratio does not fall below 1 (i.e., the number of columns does not exceed the number of rows). In one embodiment, the FIFO generator may be configured to fold the dimensions to maintain a width less than 10 and an aspect ratio of at least 32; however, in other embodiments, these thresholds may be set to any desired values.

As shown in method 500, block 520 or block 525 may be performed regardless of whether the FIFO was folded in the other step. That is, if the width of the FIFO set by the user exceeds the first minimum width threshold in block 520, the FIFO generators may still fold the FIFO dimensions based on the second minimum width threshold and the aspect ratio threshold at block 525, and vice versa. Stated differently, the criteria stipulated in blocks 520 and 525 may be performed independent of each other. Thus, the dimensions of the FIFO may be folded at both steps, only at one step, or at neither step.

Moreover, in other embodiments, the method 500 may include only one of these steps. For example, the dimensions of the FIFO may be folded based solely on block 520 without determining if the resulting aspect ratio and row width satisfy the criteria of block 525.

In one embodiment, the folding criteria established in blocks 520 and 525 may be overwritten. Specifically, the FIFO generator may include a manual folding factor input value. When a user instructs the generator to produce a FIFO, the user may define the number of times the FIFO's dimensions should be folded. Doing so may cause the FIFO generator to skip one or more of the blocks shown in method 500.

At block 530, assuming the dimensions of the FIFO were folded at blocks 520 or 525, the FIFO generator configures a memory element based on the altered dimensions. In one embodiment, the FIFO generator may call a separate software application (e.g., a RAM generator) for generating a RAM with the folded dimensions. The RAM generator may generate synthesizable code for implementing the RAM of the FIFO based on the folded dimensions. For example, if method 500 changed the FIFO dimensions from 128×1 to 16×8, the latter dimensions are transmitted to the RAM generator that produces the synthesizable code corresponding to the RAM. Nonetheless, the FIFO may still be accurately described as a 128×1 FIFO even if the underlying memory element has different dimensions.

In one embodiment, the FIFO generator or the RAM generator may further alter the folded dimensions. That is, the folded dimensions may be further optimized based on limitations or performance factors associated with the RAM. For example, the RAM may be limited to row widths with certain dimensions (e.g., only an even number of cells in each row). If the method 500 generates folded dimensions of 32×11, the FIFO generator or the RAM generator may change the dimensions from 32×11 to 32×12 to satisfy the limitations of the memory element or to increase the performance of the RAM.

Figure 6:
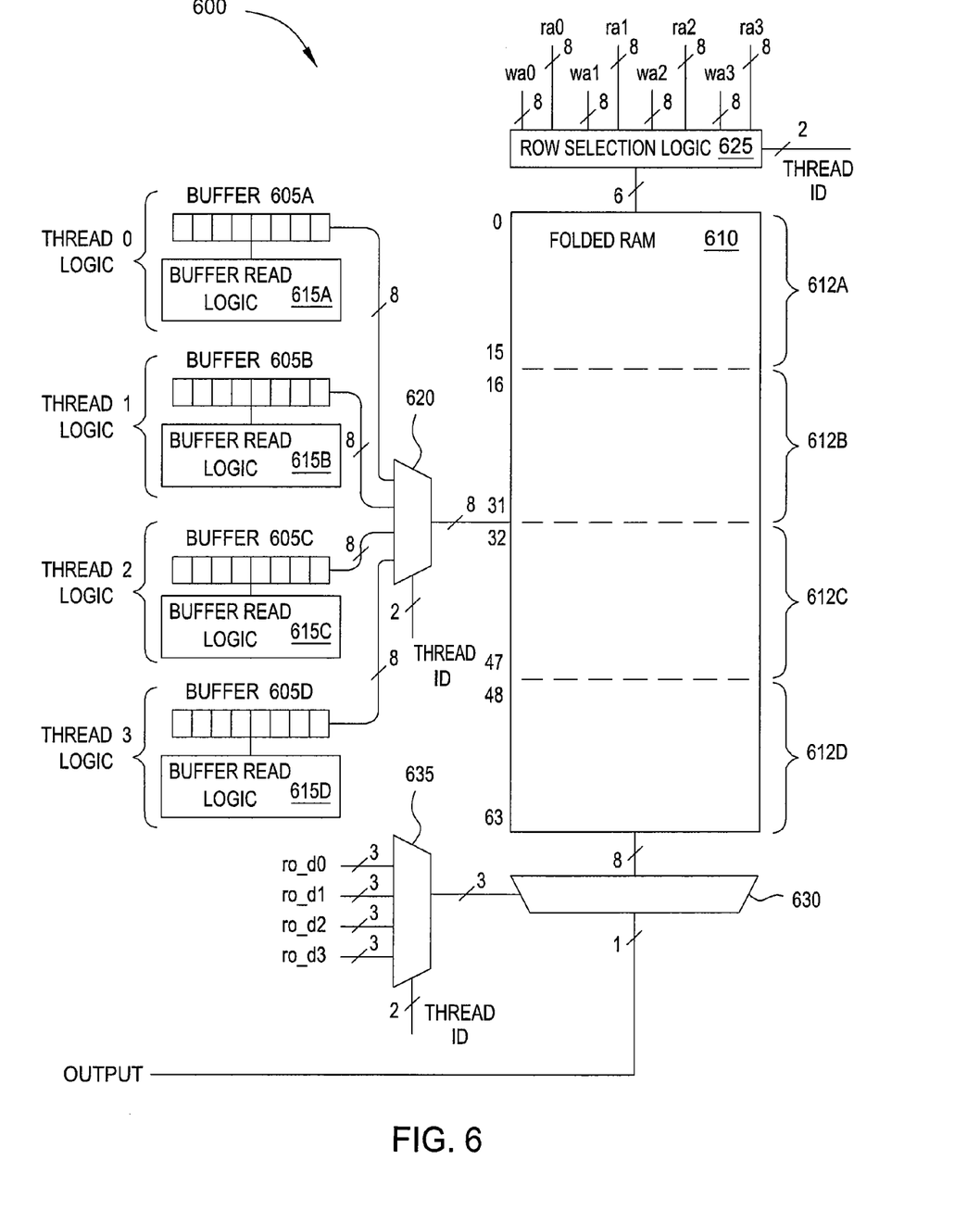
FIG. 6 illustrates a hardware system of a FIFO accessed by multiple threads, according to one embodiment of the present invention.

FIG. 6 illustrates a wrapper 600 in a FIFO accessed by multiple threads, according to one embodiment of the present invention. Specifically, wrapper 600 includes a folded RAM 610 that enables multiple threads to access a single FIFO. As shown, folded RAM 610 provides storage for a 512×1 FIFO that is accessed by four different threads—Threads 0, 1, 2, and 3. Folded RAM 610 is divided into four logical partitions 612A-612D that are each associated with one of the threads. For example, Thread 0 is assigned the cell locations in the first 16 rows of the RAM 610, Thread 1 is assigned the cell locations in the next 16 rows of the RAM 610, and so forth. Thus, each thread can store 128 bits in folded RAM 610.

Wrapper 600 also includes a buffer 605 and buffer read logic 615 for each of the threads. In one embodiment, buffers 605A-D and buffer read logics 615A-D may be used to perform the same tasks discussed in FIGS. 3A-3G. For example, each thread may transmit data to their respective buffers 605A-D using a multiplexed/shared input or respective inputs. If the thread then transmits a read request for data stored in a buffer 605, wrapper 600 may use the respective buffer read logic 615 to retrieve the data from that buffer 605. Although not shown, wrapper 600 may include additional logic that permits the data retrieved by the buffer read logics 615A-D to be routed to the output of wrapper 600. Moreover, wrapper 600 includes a mux 620 that allows buffers 605A-D to transmit groups of 8 bits to be stored in folded RAM 610. Each thread may have a respective thread ID that is used as the select signal for mux 620. If, for example, buffer 605A is full and wrapper 600 needs to accommodate a request from Thread 0 to store a new data bit, wrapper 600 may use the thread ID corresponding to Thread 0 to control mux 620 such that the contents of buffer 605A are stored in folded RAM 610.

Wrapper 600 also includes row selection logic 625 for indicating which row data received from buffer 605 should be stored. Much like mux 620, the row selection logic 625 may use the thread ID to select which write address should be used—i.e., write address wa0 corresponds to data received from Thread 0, write address wa1 corresponds to data received from Thread 1, and so forth. Continuing the previous example, to store the contents of buffer 605A in RAM 610, row selection logic 625 instructs folded RAM 610 to store the contents at write address wa0. In one embodiment, the write addresses may be used to directly indicate the row using, for example, the most significant bits. Alternatively, row selection logic 625 may derive the row based on the write address and the current thread ID. For example, the row selection logic 625 may use the four most significant bits of a seven bit write address to determine a row from 0-15. Using the thread ID, the row selection logic 625 may determine a row offset to add to the row specified by the write address. For example, if wrapper 600 is storing the contents of buffer 605B, the row selection logic 625 may add a 16 row offset value to the row derived from write address wa1. Thus, if write address wa1 specified that the correct row to store the contents of buffer 605B was row 2 (which is in the portion 612A of folded RAM 610 assigned to Thread 0) using the thread ID, the row selection logic 625 instructs folded RAM 610 to instead store the data at row 18 which is in the portion 612B assigned to Thread 1. If wrapper 600 was writing contents from buffer 605C or 605D to RAM 610, the row selection logic 625 may use an offset of 32 or 48 rows, respectively. Alternatively, the FIFO logic external to the wrapper 600 may maintain the absolute write address which is then supplied to the wrapper 600 which would then not need to perform the offset. Regardless of the addressing scheme used, the separate synchronous threads may write data to a shared memory element.

To read data from folded RAM 610, wrapper 600 uses the row selection logic 625 to select a particular row in folded RAM 610. However, instead of using the write address, the row selection logic 625 identifies the row based on the read address (ra0, ra1, ra2, and ra3). For example, the logic 625 may use a similar process described above to identify a row to read out of folded RAM 610—i.e., the row may be derived directly from the read address or by combining the read address with the thread ID. Once folded RAM 610 outputs the correct row, wrapper 610 uses mux 630 and mux 635 to determine which bit in the row is the output bit. Specifically, mux 635 receives bit offset signals (ro_d0, ro_d1, ro_d2, and ro_d3) associated with the respective threads. Based on the thread ID, the mux 635 outputs the correct bit offset signal which is then used as the select signal of mux 630. For example, if the wrapper is retrieving data associated with Thread 3, the row selection logic 625 uses the read address ra3 to select a particular row in RAM 610 that is associated with Thread 3 (i.e., rows 48-63).

So long as the thread ID is set to a value corresponding to Thread 3, mux 635 outputs the bit offset signal of Thread 3 (ro_d3) which is then used by mux 630 to select the correct bit from the output of folded RAM 610.

In one embodiment, wrapper 600 is used in a synchronous FIFO that permits only sequential access to the data stored in the FIFO. Moreover, in one embodiment, the dimensions of folded RAM 610 match the size of the FIFO such that the memory element does not include any unused memory cells. Here, the number of rows assigned to each thread is a multiple of the width of each row. This may prevent the buffers for colliding and storing data associated with one thread into a portion of folded RAM 610 assigned to a different thread.

In sum, to more efficiently use a memory element that stores the data in a FIFO, a code generator may generate a wrapper that enables the FIFO to use a memory element with different dimension (i.e., depth and width) than the FIFO's dimensions. For example, the wrapper enables a 128 deep, 1 bit wide FIFO to store data in a memory element with 16 rows that store 8 bits each. To any system communicating with the FIFO, the FIFO behaves like a 128×1 FIFO even though the FIFO is implemented using a 16×8 memory element. To do so, the code generator may generate a wrapper which enables the folded memory element to behave like a memory element that was not folded. In particular, the wrapper includes logic that governs how data is read into, and read out of, the folded memory element. Using the 128×1 FIFO as an example, the wrapper may store data in 8 bit chunks in the folded 16×8 memory element. In this manner, each storage location in the memory element may be used. Not only does folding the dimensions of the memory element improve storage efficiency, the resulting memory element may require less area (e.g., have smaller footprint in an integrated circuit) relative to using an unfolded memory element.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to embodiments of the present invention, other and further embodiments of the invention may be devised without departing from the basic scope thereof, and the scope thereof is determined by the claims that follow.

The invention claimed is:

1. A method, comprising:
receiving a request to store a first data portion in a first-in first-out (FIFO) memory, wherein the FIFO memory includes a memory element comprising a plurality of rows and has depth and width dimensions that differ from depth and width dimensions of the FIFO memory, and a buffer that is sized to store a single row of the memory element;
storing the first data portion in the buffer in the FIFO memory;
receiving a request to store a second data portion in the FIFO memory;
determining that storing the second data portion in the buffer would exceed a capacity of the buffer; and
transferring the contents of the buffer into a single row of the memory element in the FIFO memory, wherein each row in the memory element is sized to store multiple data portions.

2. The method of claim 1, further comprising:
receiving a read request to retrieve a stored data portion from the FIFO memory;
determining whether the stored data portion is within the buffer or within the memory element;

if the stored data portion is within the buffer, retrieving the stored data portion from the buffer without accessing the memory element; or if the stored data portion is within the memory element, retrieving the stored data portion from the memory element without accessing the buffer.

3. The method of claim 2, wherein the stored data portion is not deleted when read from the buffer or memory element.

4. The method of claim 1, wherein a total number of rows in the memory element is less than a total depth of the FIFO memory.

5. The method of claim 1, wherein a row width of the memory element is selected by altering depth and width dimensions of the FIFO memory until the width dimension corresponding to the altered dimensions is less than or equal to a minimum width threshold.

6. The method of claim 1, wherein the memory element comprises a random access memory (RAM), and wherein the first data portion is stored in one or more memory cells of the RAM.

7. The method of claim 1, further comprising:
receiving a simultaneous read request and write request to the same memory address:
routing a third data portion associated with the simultaneous read request and write request to an output of the FIFO memory via a data path that bypasses the buffer and the memory element; and
storing the third data portion in the buffer, wherein the third data portion is simultaneously routed via the data path and stored in the buffer.

8. The method of claim 1, further comprising storing the second data portion in the buffer in the FIFO memory simultaneously with transferring the contents of the buffer into the single row of the memory element.

9. The method of claim 1, further comprising:
receiving a request to store a third data portion in the FIFO memory;
determining that storing the third data portion in the buffer would exceed a capacity of the buffer;
determining that transferring the contents of the buffer into the memory element in the FIFO memory would exceed a capacity of the memory element; and
stalling the third request to store the third data portion in the FIFO memory.

10. A non-transitory computer-readable storage medium including instructions that, when executed by a processing unit, cause the processing unit to:
receive a request to store a first data portion in a first-in first-out (FIFO) memory, wherein the FIFO memory includes a memory element comprising a plurality of rows and has depth and width dimensions that differ from depth and width dimensions of the FIFO memory, and a buffer that is sized to store a single row of the memory element;
store the first data portion in the buffer in the FIFO memory;
receive a request to store a second data portion in the FIFO memory;
determine that storing the second data portion in the buffer would exceed a capacity of the buffer; and
transfer the contents of the buffer into a single row of the memory element in the FIFO memory, wherein each row in the memory element is sized to store multiple data portions.

11. The non-transitory computer-readable storage medium of claim 10, further comprising computer-readable program code configured to:
receive a read request to retrieve a stored data portion from the FIFO memory;
determine whether the stored data portion is within the buffer or within the memory element;
if the stored data portion is within the buffer, retrieve the stored data portion from the buffer without accessing the memory element; or
if the stored data portion is within the memory element, retrieve the stored data portion from the memory element without accessing the buffer.

12. The non-transitory computer-readable storage medium of claim 11, wherein the stored data portion is not deleted when read from the buffer or memory element.

13. The non-transitory computer-readable storage medium of claim 10, wherein a total number of rows in the memory element is less than a total depth of the FIFO memory.

14. The non-transitory computer-readable storage medium of claim 10, wherein a row width of the memory element is selected by altering depth and width dimensions of the FIFO memory until the width dimension corresponding to the altered dimensions is less than or equal to a minimum width threshold.

15. The non-transitory computer-readable storage medium of claim 10, wherein the memory element comprises a random access memory (RAM), and wherein the first data portion is stored in one or more memory cells of the RAM.

16. A FIFO memory, comprising:
a memory element comprising a plurality of rows and coupled to a buffer, wherein each row in the memory element is sized to store multiple data portions, and wherein the memory element has depth and width dimensions that differ from depth and width dimensions of the FIFO;
the buffer for storing a plurality of data portions associated with write requests received by the FIFO memory, wherein the buffer is sized to store a single row of the memory element; and
routing logic configured to determine that storing a next data portion in the buffer would exceed a capacity of the buffer and transfer the contents of the buffer into a single row of the memory element.

17. The FIFO memory of claim 16, further comprising selection logic configured to, in response to a read request to retrieve a stored data portion:
determine whether the stored data portion is within the buffer or within the memory element;
if the stored data portion is within the buffer, retrieve the stored data portion from the buffer without accessing the memory element; or
if the stored data portion is within the memory element, retrieve the stored data portion from the memory element without accessing the buffer.

18. The FIFO memory of claim 17, wherein the selection logic comprises a delayed buffer disposed in a data path between the buffer and an output of the FIFO memory, and the delayed buffer is configured to store the stored data portion retrieved from the buffer before the stored data portion is output from the FIFO memory.

19. The FIFO memory of claim 17, wherein the selection logic comprises a multiplexer disposed in a data path between the memory element and an output of the FIFO memory, and the multiplexer is configured to select the stored data portion from a plurality of data portions stored within a row of the memory element.

20. The FIFO memory of claim 16, wherein a total number of rows in the memory element is less than a total depth of the FIFO memory.

21. The FIFO memory of claim 16, wherein a row width of the memory element is selected by altering depth and width dimensions of the FIFO memory until the width dimension corresponding to the altered dimensions is less than or equal to a minimum width threshold.

22. The FIFO memory of claim 16, wherein the memory element comprises a random access memory (RAM), and wherein the first data portion is stored in one or more memory cells of the RAM.

* * * * *